(12) United States Patent
Juul

(10) Patent No.: US 6,578,356 B2
(45) Date of Patent: Jun. 17, 2003

(54) METHOD AND ARRANGEMENT FOR HYDRAULIC STEERING

(75) Inventor: Torben Juul, Sønderborg (DK)

(73) Assignee: Sauer-Danfoss (Norborg) A/S (DK)

( * ) Notice: Subject to any disclaimer, the term of this patent is extended or adjusted under 35 U.S.C. 154(b) by 0 days.

(21) Appl. No.: 09/975,497

(22) Filed: Oct. 10, 2001

(65) Prior Publication Data

US 2002/0040823 A1 Apr. 11, 2002

(30) Foreign Application Priority Data

Oct. 11, 2000 (DE) .......................... 100 50 211

(51) Int. Cl.⁷ .............................. B62D 5/093
(52) U.S. Cl. ............................ 60/384; 60/468
(58) Field of Search .................. 91/516; 60/422, 60/468, 384, 385

(56) References Cited

U.S. PATENT DOCUMENTS 4,730,544 A  * 3/1988 Jorgensen .............. 60/384
4,774,807 A  * 10/1988 Pedersen .............. 60/384
5,701,970 A  12/1997 Arbjerg .............. 60/384

FOREIGN PATENT DOCUMENTS

DE          43 42 933 A1    6/1995

* cited by examiner

*Primary Examiner*—Edward K. Look
*Assistant Examiner*—Thomas E. Lazo
(74) *Attorney, Agent, or Firm*—Altera Law Group LLC

(57) ABSTRACT

Disclosed herein is a method for hydraulic steering. The method includes supplying a steering unit with a controlled working pressure from a load signal line dependent upon a load signal. The load signal being generated via a load signal fluid having a fluid flow. Also disclosed herein is a hydraulic steering arrangement for carrying out the method. A load signal adjustment device is provided through which the fluid flow can be adjusted to an at least approximately constant value.

13 Claims, 1 Drawing Sheet

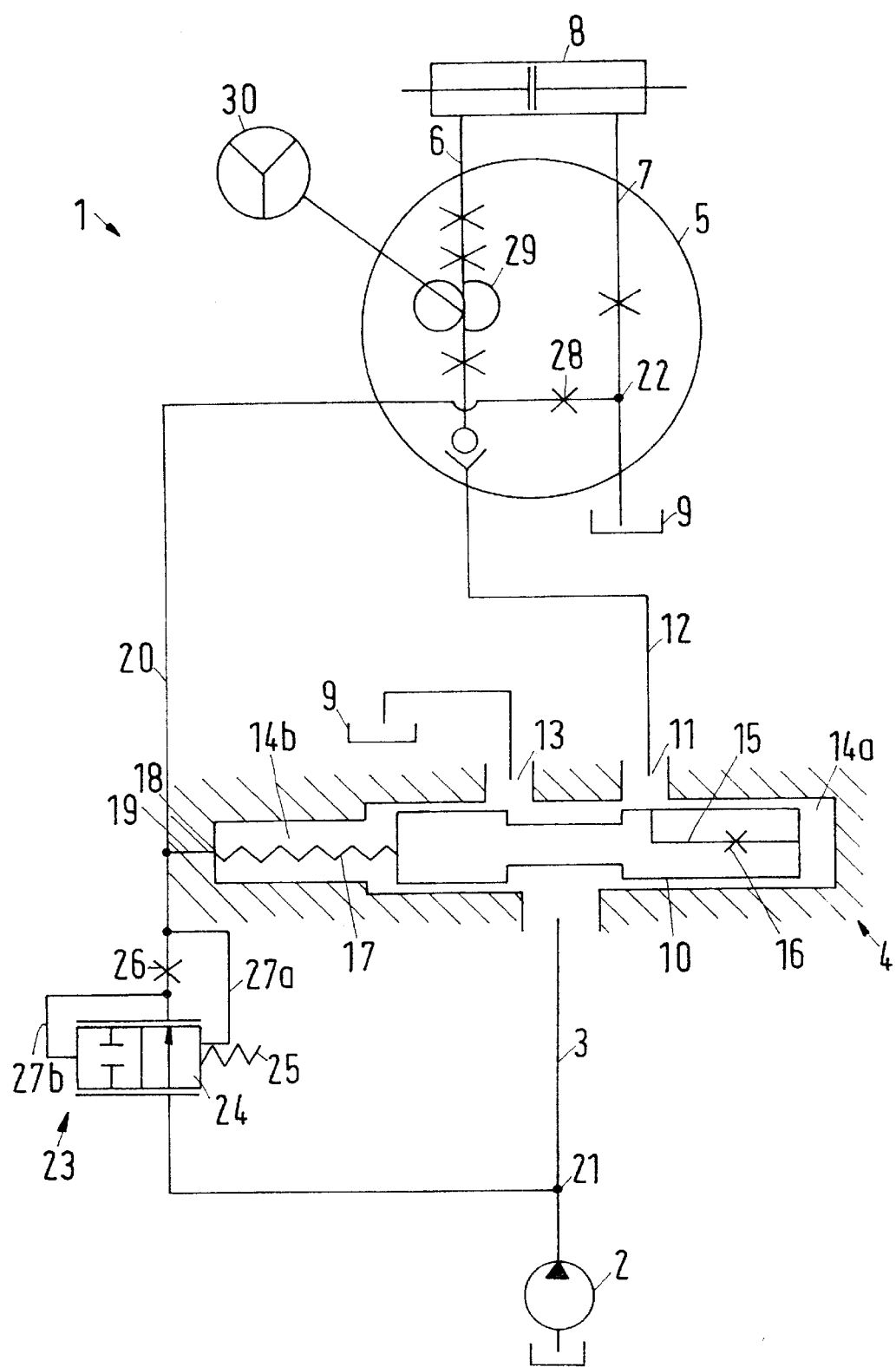

METHOD AND ARRANGEMENT FOR HYDRAULIC STEERING

The invention relates to a method for hydraulic steering, particularly of vehicles, according to which a steering unit is supplied with a controlled working pressure in dependence of a load signal from a load signal line, the load signal being generated via a load signal fluid with a fluid flow, and to a hydraulic steering arrangement with a steering unit, which can be supplied, in dependence of a load signal, with a fluid flow in a load signal line with a controlled working pressure.

A steering arrangement of this kind is known from DE 43 42 933. In this embodiment, the pressure of the controlled steering fluid can be taken from an outlet of the priority valve. The slide of the priority valve, which limits the outlet towards the inside of the priority valve, is penetrated by two pressure paths, each provided with a throttle, through which the pressure on the outlet is passed on to pressure chambers, arranged on both front sides of the slide. One of the two pressure chambers has a spring, which additionally acts upon the corresponding front side of the slide with a spring force. Further, this pressure chamber is connected with a steering throttle via a load signal line. On the outlet, a load signal fluid is branched off from the steering fluid, and flows via the pressure path inside the slide, which is connected with the pressure chamber with the spring, into this pressure chamber and on to the steering throttle via the load signal line. The flow of the load signal fluid is thus regulated in the slide via the pressure difference of the throttle of this pressure path, which corresponds to the pressure of the spring. This means that changes of the flow of the load signal fluid can be effected by displacing the slide.

The invention is based on the task of improving the operating comfort with a method and an arrangement of the kind described in the introduction.

With regard to method, this task is solved according to the invention in that the fluid flow is adjusted to assume an at least approximately constant value.

This ensures a stable flow of the fluid and thus stable conditions for the generation of the load signal in the load signal line. This permits a more accurate control of the working pressure, which increases the operating comfort of the steering arrangement.

It is advantageous that the adjustment of the fluid flow is merely effected by means of parameters of the load signal fluid. This procedure ensures that the fluid flow is adjusted independently of other parameters, which occur during the steering. For example, the influence of the working pressure of the steering fluid on the load signal fluid can be prevented, which could otherwise cause an interference with the load signal.

It is particularly advantageous that a load signal pressure in the load signal line adjusts the fluid flow. The use of the load signal pressure in the load signal line provides a wide spectre of useful, known and reliable adjustment functions. In most cases it will thus be possible to adapt the method to the anticipated operating conditions by means of already tested adjustment functions.

With regard to the arrangement, the task is solved according to the invention in that a load signal adjustment device is provided, through which the fluid flow can be adjusted to an at least approximately constant value.

Through the at least approximately constant fluid flow, the load signal adjustment device ensures stable conditions in the load signal line. This enables the generation of a relatively accurate load signal, which again causes a more accurate control of the working pressure and thus an improvement of the operating comfort.

In this connection, it is advantageous that the load signal adjustment device is merely adjustable by parameters of the load signal fluid. Thus, other parameters occurring in the hydraulic steering arrangement have no influence on the function of the load signal adjustment device. This prevents the occurrence of possible interferences when generating the load signal in the load signal line.

Further, it is advantageous that the load signal adjustment device is adjustable by means of a load signal pressure in the load signal line. This enables several variants when operating the adjustment device, and thus a good adaptation of the hydraulic steering arrangement to the operating conditions in question.

In a preferred embodiment it is ensured that the load signal adjustment device is arranged in the load signal line and has a direct connection only with this line. Thus, the load signal line has an independent load signal adjustment device, which works independently of other devices or parameters than the load signal devices and their parameters. In this way, interfering influences on the adjustment of the fluid flow can be avoided.

In a further favourable embodiment it is ensured that the load signal adjustment device is connected with a control throttle in the steering unit via the load signal line, the load signal pressure being adjustable via said throttle. This causes that the control throttle, which controls the load signal pressure, can be acted upon with a relatively constant fluid flow of the load signal fluid. This gives stable conditions for building up the load signal pressure or the generation of the load signal, respectively.

It is advantageous that the load signal adjustment device has a flow control valve, which keeps a fluid flow at an at least approximately constant value. This substantially constant fluid flow ensures stable flow conditions, also at the adjustable control throttle. Accordingly, during operation of the steering arrangement, a stable relation may be anticipated between an opening width of the adjustable control throttle and the load signal pressure in the load signal line depending on this opening width, said pressure acting upon the slide of the priority valve. This ensures a stable control function of the steering arrangement.

It is favourable that the load signal adjustment device has an adjustment throttle, taps being arranged before and after the adjustment throttle, said taps being connected with the flow control valve via adjustment connections. This gives a simple control of the fluid flow within the load signal line. As the control of the fluid flow is exclusively based on pressures available in the load signal line, the priority valve and the pressures of the steering fluid have no essential influence on the load signal adjustment device. This increases the stability of the steering arrangement, as potential interference sources are avoided.

It is particularly advantageous that the flow control valve is a 2/2-way valve, which is adjustable by means of a valve spring. In this way, the flow control valve can be adapted to the adjustment and/or control throttle. Further, it permits the adaptation of the load signal adjustment device to various operating conditions through the use of different valve springs.

It is also advantageous that a connecting branch to a priority valve is provided between the load signal adjustment device and the control throttle, which branch controls the working pressure supplying the steering unit. The load signal pressure, which is generated by means of the very uniform fluid flow can be supplied to the priority valve through the connecting branch. Thus, a very stable control of the working pressure of the hydraulic steering arrangement can be performed.

It is also favourable that the load signal adjustment device is connected between the priority valve and a pressure source. With such an arrangement, the admission of the load signal fluid to the priority valve takes place via its own line from the pressure source via the load signal adjustment device to the priority valve. In this way interfering influences from other devices of the hydraulic steering arrangement can be avoided.

It is particularly advantageous that the pressure source is controlled by the load signal pressure. Thus, a relatively uniform fluid flow can already be ensured by the pressure source.

Further it is favourable that the load signal line connects a pump connection of the pressure source with a tank connection of a pressure sink in parallel with a working path, the priority valve, the steering unit and a steering motor being arranged in the working path. In this way, both the priority valve and the steering fluid are, at least to a great extent, separated from the load signal line, thus having no substantial influence on the load signal pressure. This reduces the risk of possible interferences with the fluid flow, which increases the function stability of the steering arrangement.

In the following, the invention is described in detail on the basis of a preferred embodiment in connection with the drawing, showing:

only FIGURE a schematic view of a steering arrangement with an adjustment device according to the invention.

The FIGURE shows a steering arrangement 1 with a pressure source 2, which provides a priority valve 4 with a constant volume via a working line 3. Downstream from the priority valve 4 a steering unit 5 is connected, which again is connected with a steering motor 8 via an inlet line 6 and a return line 7. The return line 7 flows into a pressure sink 9.

The priority valve 4 has a slide 10, which can be displaced to close or open a steering connection 11 to the connecting line 12 and a secondary connection 13. Via the secondary connection 13, a steering fluid, which is supplied from the pressure source 2 to the priority valve 4 via the working line 3, can be passed on to secondary consumers (not shown) or to the pressure sink 9. Together with the housing of the priority valve 4, the slide 10 forms on both of its front sides a pressure chamber 14a, 14b. In this connection, the pressure chamber 14a is in pressure connection with the steering connection 11 via a pressure path 15 inside the slide 10. Further, the pressure path 15 has a fixed throttle 16.

In the other pressure chamber 14b, a spring 17 engages with the corresponding front side of the slide 10. Further, this pressure chamber 14b has a load signal connection 18, which is connected with a load signal line 20 via a connecting branch 19.

The load signal line 20 connects a pump connection 21, which is connected downstream from the pressure source 2, with a tank connection 22, which is connected upstream from the pressure sink 9.

A load signal adjustment device 23 is arranged in the load signal line 20 between the pump connection 21 and the connecting branch 19 to the priority valve 4. This device 23 has a flow control valve 24, a valve spring 25, an adjustment throttle 26 and two adjustment connections 27a, 27b. In the further extension of the load signal line 20, a control throttle 28 is arranged between the connecting branch 19 and the tank connection 22 inside the steering unit 5.

In this embodiment, a flow of the load signal fluid in the load signal line 20 is controlled through the load signal adjustment device 23, independently of the priority valve 4. For this purpose, the load signal line 20 is supplied with the load signal fluid direct from the pressure source 2 via the pump connection 21. The adjustment of the fluid flow now takes place via the flow control valve 24 and the adjustment throttle 26, adjustment pressures being taken in the load signal line before and after said throttle 26, to control the flow control valve 24 via the adjustment connections 27a, 27b. For this purpose the flow control valve 24 is in the shape of a 2/2-way valve, each side of which is acted upon by one of the adjustment connections 27a, 27b. The pressure drop over the adjustment throttle 26 corresponds to the spring force of the valve spring 25. The flow control valve 24 and the adjustment throttle 26 are dimensioned in accordance with the expected fluid flow and load signal pressure.

The flow of the load signal fluid, which is kept substantially constant by the load signal adjustment device 23, is supplied to the control throttle 28 in the steering unit 5 via the load signal line 20. In the inlet line 6 to the steering motor 8, the steering unit 5 has two rotary slide elements, of which one can be turned in relation to the other through operation of a steering handwheel 30.

The other rotary slide element can, for example, be adjusted by a measuring motor 29.

The design of such a steering unit is already known from DE 43 42 933 C2, which is referred to in this connection.

Thus, relative to each other, the two rotary slide elements enclose a rotary angle. Additionally, a cross-sectional opening of the control throttle 28 is adjusted over this rotary angle. As long as the steering handwheel 30 is in its neutral position, the control throttle 28 is completely open. A turning of the steering handwheel 30 causes the rotary slide elements to be increasingly turned in relation to each other, which again causes a reduction of the cross-sectional opening of the control throttle 28. Through the partial closing of the control throttle 28, a load signal pressure is built up in the load signal line 20. Via the connecting branch 19 and the load signal connection 18, this pressure acts in the pressure chamber 14b of the priority valve 4. Thus, together with the spring 17, the load signal pressure acts upon the slide 10.

Thus, a large turning of the steering handwheel 30 will cause the two rotary slide elements to be heavily displaced in relation to each other. At the same time, the opening cross-section of the control throttle 28 is relatively heavily reduced, which again causes a relatively high load signal pressure to be built up in the load signal line 20. This pressure, together with the spring 17, now acts upon the slide 10 in the pressure chamber 14b of the priority valve 4. According to the FIGURE, the slide 10 is now displaced to the right, thus releasing the opening cross-section of the steering connection 11. Thus, an additional amount of steering fluid can now be supplied from the pressure source 2 via the working line 3 to the priority valve 4 and via the steering connection 11 and the connecting line 12 to the steering unit 5 and via the in-let line 6 to the steering motor 8.

As soon as the rotary angle between the two rotary slide elements is reduced again, for example because of the measuring motor 29, the control throttle 28 is opened again, which causes a reduction of the load signal pressure and thus also a displacement of the slide 10 to the left. In this way, the cross-sectional opening of the steering connection 11 is reduced again.

In order to achieve the fastest possible reaction at the beginning of a steering procedure from the neutral position of the steering arrangement 1, the control throttle 28 has a closing characteristic, in which the opening cross-section of the control throttle 28 is reduced faster with rotary angle units near the neutral position than with larger rotary angles.

Several deviations from the embodiments described can be imagined, without interfering with the basic idea of the invention. For example, the rotary slide elements could also be flat slides. Further, a variable pump can be used as pressure source 2. Additionally, in the steering arrangement shown in the FIGURE, the priority valve 4 and the pressure source 2 can be replaced by a variable pump. The adjustment device according to the invention is particularly suited for hydrostatic steering units for vehicles.

What is claimed is:

1. A method for hydraulic steering, comprising:
   supplying a steering unit with a controlled working pressure dependent upon a load signal from a load signal line;
   generating the load signal via a load signal fluid having a fluid flow;
   adjusting the fluid flow to an at least approximately constant value;
   connecting a load signal adjustment device with a control throttle in a steering unit via the load signal line;
   adjusting a load signal pressure via the control throttle;
   providing a connecting branch to a priority valve between a load signal adjustment device and the control throttle; and
   controlling the working pressure supplying the steering unit via the connecting branch.

2. The method according to claim 1, further comprising adjusting the fluid flow based upon parameters of the load signal fluid.

3. The method according to claim 1, further comprising adjusting the fluid flow based upon a load signal pressure in the load signal line.

4. A hydraulic steering arrangement comprising:
   a steering unit supplied with a fluid flow dependent upon a load signal in a load signal line;
   a fluid having a controllable working pressure;
   the load signal adjustment device having a flow control valve, the flow control valve maintaining the fluid flow at an at least approximately constant value;
   the load signal adjustment device having an adjustment throttle, taps being arranged before and after the adjustment throttle, the taps being connected with the flow control valve via adjustment connections.

5. The hydraulic steering arrangement according to claim 4, wherein the load signal adjustment device is adjustable based upon parameters of the load signal fluid.

6. The hydraulic steering arrangement according to claim 4, wherein the load signal adjustment device is adjustable based upon a load signal pressure in the load signal line.

7. The hydraulic steering arrangement according to claim 4, wherein the load signal adjustment device is arranged in the load signal line and has a direct connection only with this line.

8. The hydraulic steering arrangement according to claim 4, wherein the load signal adjustment device is connected with a control throttle in the steering unit via the load signal line, the load signal pressure being adjustable via the control throttle.

9. The hydraulic steering arrangement according to claim 8, wherein a connecting branch to a priority valve is provided between the load signal adjustment device and the control throttle, the connecting branch controls a working pressure supplying the steering unit.

10. The hydraulic steering arrangement according to claim 9, wherein the load signal adjustment device is connected between the priority valve and a pressure source.

11. The hydraulic steering arrangement according to claim 10, wherein the pressure source is controlled by a load signal pressure.

12. The hydraulic steering arrangement according to claim 10, wherein a load signal line connects a pump connection of the pressure source with a tank connection of a pressure sink in parallel with a working path, the priority valve, the steering unit and a steering motor being arranged in the working path.

13. The hydraulic steering arrangement according to claim 4, wherein the flow control valve is a 2/2-way valve, which is adjustable via a valve spring.

* * * * *